US010792785B2

United States Patent
Zhang

(10) Patent No.: US 10,792,785 B2
(45) Date of Patent: Oct. 6, 2020

(54) CHEMICAL-MECHANICAL PROCESSING SLURRY AND METHODS FOR PROCESSING A NICKEL SUBSTRATE SURFACE

(71) Applicant: Cabot Microelectronics Corporation, Aurora, IL (US)

(72) Inventor: Ke Zhang, Singapore (SG)

(73) Assignee: Cabot Microelectronics Corporation, Aurora, IL (US)

( * ) Notice: Subject to any disclaimer, the term of this patent is extended or adjusted under 35 U.S.C. 154(b) by 581 days.

(21) Appl. No.: 15/615,591

(22) Filed: Jun. 6, 2017

(65) Prior Publication Data

US 2017/0348820 A1 Dec. 7, 2017

Related U.S. Application Data

(60) Provisional application No. 62/346,778, filed on Jun. 7, 2016.

(51) Int. Cl.
*B24B 37/04* (2012.01)
*C09K 3/14* (2006.01)
*C09G 1/02* (2006.01)

(52) U.S. Cl.
CPC .............. *B24B 37/044* (2013.01); *C09G 1/02* (2013.01); *C09K 3/1463* (2013.01); *C09K 3/1472* (2013.01)

(58) Field of Classification Search
CPC ........... B24B 1/00; B24B 37/044; C09G 1/02; C09K 3/1463
USPC ..................... 451/41, 37, 287–290; 252/79.1
See application file for complete search history.

(56) References Cited

U.S. PATENT DOCUMENTS

| 8,226,841 B2 * | 7/2012 | Palanisamy Chinnathambi .......... C09K 3/1463 216/100 |
| 2003/0168628 A1 * | 9/2003 | Vacassy .................... C09G 1/02 252/79.1 |
| 2004/0266323 A1 * | 12/2004 | Oshima ................ C09K 3/1463 451/41 |
| 2005/0221726 A1 * | 10/2005 | Honma ................ C09K 3/1463 451/41 |
| 2006/0135045 A1 * | 6/2006 | Bian ........................ C09G 1/02 451/36 |
| 2007/0167116 A1 | 7/2007 | Yoshida et al. |
| 2009/0081871 A1 * | 3/2009 | Dysard .................... C09G 1/02 438/693 |
| 2013/0313226 A1 * | 11/2013 | Palanisamy Chinnathambi .......... C09K 3/1463 216/53 |
| 2015/0376458 A1 | 12/2015 | Grumbine et al. |

FOREIGN PATENT DOCUMENTS

MY 141876 A 7/2010

OTHER PUBLICATIONS

Korean Intellectual Property Office as ISA, International Search Report issued in connection with Application No. PCT/US2017/036203 dated Sep. 12, 2017.
Taiwan Intellectual Property Office, Search Report issued in connection with Taiwan Patent Application No. 106118617 dated Mar. 19, 2018.

* cited by examiner

*Primary Examiner* — George B Nguyen
(74) *Attorney, Agent, or Firm* — Thomas Omholt; Erika S. Wilson; Daniel C. Schulte

(57) ABSTRACT

Described are slurry compositions useful in chemical-mechanical processing of a nickel layer of a substrate, wherein the slurry compositions contain abrasive particles that include silica particles that are cationically charged at a low pH.

8 Claims, No Drawings

CHEMICAL-MECHANICAL PROCESSING SLURRY AND METHODS FOR PROCESSING A NICKEL SUBSTRATE SURFACE

FIELD OF THE INVENTION

The invention relates to chemical mechanical processing (CMP) compositions and methods including compositions and methods for polishing nickel phosphorus (NiP) surfaces for hard disk applications.

BACKGROUND

The electronics and microelectronics industries rely on chemical mechanical processing techniques for preparing sophisticated electronic devices that pervade our modern world. These include microprocessors and other integrated circuits that rely on silicon and other semiconductor materials; solid state and hard disk memory devices; optical materials and devices; and various other commercial and consumer electronic items.

One ubiquitous example is the hard magnetic disk, used for storing digital information in a manner that allows for highly efficient random access of the information. Hard disks now available for memory applications include multiple layers of different materials coated onto a rigid disk base. Each layer can have a different specialized function based on specific mechanical or magnetic properties of the material of the layer. One of the layers functions as a magnetic storage layer. But the other layers are also critical to reliable performance of the hard disk product, meaning that precision placement of each and every layer is essential in preparing the disk.

One layer that is common in a hard memory disk is a non-magnetic nickel layer, e.g., NiP, especially electroless NiP, which is present to provide hardness. The processed nickel layer is strong, hard, and can be processed to a highly smooth and uniform surface that allows the nickel layer to serve as a base for added magnetic and other layers. See, e.g., U.S. Pat. No. 6,977,030. The nickel layer can be provided by electroless plating and may be referred to as "electroless" NiP. See, e.g., U.S. Pat. No. 6,410,104.

The nickel layer as applied will have surface properties (roughness, micro-waviness, flatness) that are not immediately suitable for further processing into a hard disk, such as by applying additional constituent layers of the multi-layer hard disk. Current manufacturing techniques include processing the surface of an applied nickel layer by chemical mechanical processing to improve the surface properties, especially smoothness (i.e., reduced roughness and micro-waviness), before depositing additional layers of a hard disk product.

In processing the surface, various CMP techniques, abrasive particles, and chemicals have been used. Important factors in methods for preparing the nickel layer surface include a relatively high removal rate (to maintain processing throughput and an adequate cost of operation) and highly uniform resultant surface properties with a low level of scratching.

Balancing factors of removal rate and highly refined surface properties leads to different processing options, such as using relatively hard abrasive particles to provide higher removal rates, but which can produce excessive scratching, versus using softer particles that provide less scratching but have a lower removal rate. Sometimes, multiple separate steps are used including a first step that uses hard abrasive particles to effect a high removal rate, followed by at least one subsequent step using softer particles that have a lower removal rate but provide a more gentle (fine) process and a final, low roughness, low scratch surface. The first step may include the use of one or more of: hard abrasive particles (e.g., alumina particles), relatively large abrasive particle size, a relatively hard CMP pad, and relatively high pressure between the pad and the nickel layer surface during processing. In a subsequent (fine) step designed to provide a finished (low roughness) surface at a relatively lower removal rate, generally smaller sized and softer (e.g., silica) particles may be used along with lower pad pressure and a relatively softer CMP pad. Ultimately the nickel layer surface exhibits a low roughness, low micro-waviness, and a low level of scratching, to which subsequent layers may be applied.

Many slurries used for processing a nickel phosphorus surface contain alumina or a mixture of alumina and colloidal silica as abrasive. Alumina is more typically used for achieving a relatively high removal rate, such as in a first or early step. But due to the hardness of alumina, these abrasive particles can become embedded in a surface of the nickel layer during processing, forming an embedded (alumina) particle defect. The alumina abrasive particle can remain embedded in the nickel layer throughout subsequent processing, eventually forming a surface protrusion in a finished hard magnetic disk surface. During use of the hard magnetic disk product, the surface protrusion can directly cause a head crash as a magnetoelectric read or write head flies over the magnetic disk surface, contacting the surface protrusion.

One way to eliminate embedded particle defects and their associated potential for causing a head crash is to use CMP processes and slurries that have a reduced need for alumina particles, by developing abrasive slurries that contain a reduced amount of alumina abrasive particles, preferably even slurries that contain no alumina particles (i.e., "alumina-free" slurries). Yet high manufacturing throughput and commercially-feasible cost of ownership requirements ensure that high removal rate remains a high priority in processing a nickel layer of a hard disk. Slurries that contain only silica as abrasive particles ("silica-only" slurries) have been studied as one possible solution to embedded particle defects. At present, however, removal rates (of NiP) using slurries that contain only silica abrasive particles remain low compared to alumina-containing slurries.

SUMMARY

The following describes new and inventive slurries that can be used for processing a nickel (e.g., electroless nickel phosphorus) surface of a substrate by chemical mechanical processing. The slurries can be referred to as "slurry compositions," "CMP slurries," "abrasive slurries," or simply as a "slurry" or "composition," or the like. A "CMP process" includes steps of planarization, polishing, or other steps of processing a surface by chemical mechanical processing.

A novel and inventive slurry as described for use in a CMP procedure, contains liquid carrier (e.g., water, organic solvent, or both), cationic silica abrasive particles, oxidizer, and optional other ingredients useful in a CMP slurry for processing a nickel-phosphorus substrate surface.

The cationic silica particles include a cationic compound, and thereby exhibit a positive (cationic) charged at low pH, such as at a pH of not greater than 3, or not greater than 2. The chemistry of the cationic compound may vary, with examples of useful cationic compounds including nitrogen-containing and phosphorus-containing compounds such as reactive amino silane and phosphonium silane compounds, among others.

The cationic silica particles can be of any known or future-developed form of silica, including fumed silica, fused silica, colloidal silica, etc., prepared or treated to include added cationic compound that will exhibit a cationic charge in the slurry at a low pH.

The cationic compound may be present at any useful location in a silica particle, such as at an internal location that may be throughout a particle interior, at a discrete portion of the particle interior such as at an inner core, within an intermediate layer at an interior of the particle, or at an exterior layer or outer shell of the particle. Alternately or additionally, cationic compound can be placed at a surface of a silica particle by surface treatment of silica particles, becoming chemically attached to the particle surface without becoming located substantially internal to the particles.

Preferred cationic silica particles can have a zeta potential when present in the slurry and at a low slurry pH (e.g., not greater than 3 or not greater than 2) of at least 5 millivolts, e.g., at least 10 millivolts, or higher. The charge on particles in a CMP slurry is commonly referred to as zeta potential (or the electrokinetic potential), which refers to the electrical potential difference between the electrical charge of the ions surrounding the particle and the electrical charge of the bulk solution of the CMP composition (e.g., the aqueous (liquid) carrier and any other components dissolved therein). The zeta potential is typically affected by the pH of the liquid carrier. For a given slurry composition, the isoelectric point of the particles is defined as the pH at which the zeta potential is zero. As the pH is increased or decreased away from the isoelectric point, the surface charge (and hence the zeta potential) is correspondingly decreased or increased (to a negative or a positive zeta potential value). Zeta potential of particles of a slurry may be measured using standard commercial equipment such as a Model DT-1202 Acoustic and Electro-acoustic spectrometer available from Dispersion Technologies, Inc. (Bedford Hills, N.Y.).

According to the invention, silica particles that exhibit a cationic charge in a low pH slurry due to the presence of cationic compound incorporated into the silica particles (meaning internally or at a particle surface), can provide an increased rate of removal of nickel-phosphorus material from a nickel-phosphorus layer relative to comparable silica particles that exhibit a neutral charge or an anionic (negative) charge at the same low pH. According to embodiments of slurries and methods of the invention, a removal rate of nickel-phosphorus can be increased by use of a slurry that contain cationic silica particles as described herein (containing cationic compound incorporated into the particles), and having a low pH, compared to a removal rate achieved by an identical CMP process (including processing conditions, equipment, pad, etc., and with other features of the CMP slurry (including the same low pH) being identical) but with the slurry containing comparable silica particles that are otherwise the same (compositionally, based on size, etc.) except that the comparable silica particles are either uncharged or exhibit a negative charge.

Without wishing to be bound by theory, a nickel-phosphorus surface may become negatively charged during chemical-mechanical processing in the presence of an oxidizing agent. Cationic silica particles in a CMP slurry used to process this surface are believed to be attracted to the negatively charged surface, and this attraction is believed to improve removal rate of the nickel-phosphorus material at the surface in a manner that does not occur were the silica abrasive particles either un-charged or anionically charged in the CMP slurry.

The slurry can also include oxidizing agent (e.g., hydrogen peroxide), an optional catalyst that includes a metal ion capable of reversible oxidation and reduction in the presence of nickel-phosphorus and oxidizing agent (e.g., hydrogen peroxide), optional catalyst stabilizing agent, optional nickel complexing agent, and other optional chemical or abrasive materials that may be included to improve the CMP process by increasing removal rate or otherwise chemically assisting in providing a desired or improved surface property of the processed nickel-phosphorus surface.

The slurry may contain only cationic silica abrasive particles as described, or may include additional ("second" or "secondary") abrasive particles that may be, silica particles (different from cationic silica abrasive particles as described herein), or another type of charged or uncharged abrasive particle, e.g., alumina particles.

Certain slurry embodiments can be alumina free, meaning that the slurry contains abrasive particles that include no alumina particles or that include only a low or inconsequential amount of alumina particles such as less than 5, 2, 1, or 0.5 weight percent alumina particles based on total weight abrasive particles. In these or other slurry embodiments, the abrasive particles of a slurry may be entirely silica or may be substantially silica, meaning that the slurry contains abrasive particles that are at least 90, 95, 98, 99, 99.5, or more weight percent silica particles (e.g., cationic silica particles), and not more than a low or inconsequential amount of non-silica particles such as less than 10, 5, 2, 1, or 0.5 weight percent non-silica particles based on total weight abrasive particles.

An inventive slurry can be useful in chemical-mechanical processing a surface of a nickel layer by contacting the surface with the slurry and a pad, with pressure and motion between the pad and the surface, to chemically and mechanically remove material from the nickel layer surface. The described slurries and inventive methods can be useful for treating a nickel surface at any stage of preparation, including treating a surface as deposited onto a substrate, or in any of a series of two or more CMP steps that may be performed on a nickel layer after it is deposited.

In one aspect, the invention relates to a method of treating a nickel-phosphorus surface at a low pH. The method includes: providing a substrate having a nickel surface; and providing a slurry having a pH below 3. The slurry includes: liquid carrier, cationic silica abrasive particles dispersed in the liquid carrier, the cationic silica abrasive particles containing cationic compound that is a nitrogen-containing compound or a phosphorus-containing compound that exhibits a cationic charge in the slurry at the slurry pH, and oxidizing agent. The method includes contacting the substrate surface with the slurry to remove material from the surface.

In another aspect, the invention relates to a chemical mechanical processing slurry useful for processing a nickel surface. The slurry includes: liquid carrier, cationic silica abrasive particles dispersed in the liquid carrier, the cationic silica abrasive particles containing cationic compound that is a nitrogen-containing compound or a phosphorus-containing compound that exhibits a cationic charge in the slurry at a pH below 3, and oxidizing agent. The slurry has a pH below 3.

DETAILED DESCRIPTION

The following describes new and inventive CMP slurries that can be used for processing a surface of a nickel-phosphorus (e.g., electroless nickel phosphorus) layer (sometimes referred to as a "nickel layer") by chemical mechanical processing. The slurries contain liquid carrier (e.g., water, organic solvent, or both), cationic silica abrasive particles, oxidizer (at the point of use and, optionally, previous to that), and other optional ingredients useful in a CMP slurry for processing a nickel layer.

The silica particles can be of any type of silica that is presently known or that is developed in the future, and that can be prepared to incorporate cationic compound into the silica particles. Examples of known types of silica materials useful for the described particles include fumed silica, fused silica, and colloidal (wet process) silica.

Cationic silica particles useful in a slurry or method of this description can be prepared by various methods that include forming silica particles and, either during or after formation, incorporating cationic compound into the interior of the silica particles or onto surfaces of the silica particles. Example silica particles include precipitated or condensation-polymerized silica, which may be prepared using known methods, such as by methods referred to as the "sol gel" method or by silicate ion-exchange. Condensation-polymerized silica particles are often prepared by condensing $Si(OH)_4$ to form substantially spherical particles. The precursor $Si(OH)_4$ may be obtained, for example, by hydrolysis of high purity alkoxysilanes, or by acidification of aqueous silicate solutions. U.S. Pat. No. 5,230,833, the entirety of which is incorporated herein by reference, describes a method for preparing colloidal silica particles in solution.

To provide silica particles that exhibit a cationic charge, the particles may be prepared in a manner that includes incorporating cationic compound into the particles, meaning placing cationic compound at the particle interior or at a particle surface. The cationic compound can be any organic compound (which includes an organic group or moiety of a larger compound) that can be incorporated into or onto silica abrasive particles, and that will exhibit a cationic charge at low pH. Examples include nitrogen-containing and phosphorus-containing compounds that include a nitrogen or a phosphorus atom that can become cationically charged at low pH.

Various such organic compounds can be useful, including both reactive cationic compounds and non-reactive cationic compounds. Reactive cationic compounds include a cationic portion and a reactive portion that can be chemically reacted with a silica particle or precursor thereof to become chemically bonded to a silica particle. Non-reactive cationic compounds include a cationic portion but not a reactive portion, and do not become chemically reacted or bonded to a silica particle but can be physically incorporated into an interior portion of a silica particle. In this regard, as used herein, a "cationic compound" that is incorporated into a silica particle refers to both: a non-reactive, cationic organic compound that is physically incorporated into an interior of a silica particle without being chemically reacted with or bonded to the particle, e.g., incorporated into a silica particle matrix during particle formation; and an organic, cationic chemical group or moiety that is chemically (e.g., covalently) bonded to a silica particle either at an interior location or at a particle surface.

Desirably, for cationic silica particles to perform well as part of an abrasive slurry, the presence of the cationic compound as part of the silica particle, whether at an interior, inner layer, outer layer, or surface, and whether or not chemically bonded to the particle, does not unduly alter (e.g., diminish) the mechanical properties, and therefore the abrasive properties, of the silica particles. For example, the incorporation of cationic compound at an interior or surface of silica particles preferably does not substantially reduce the hardness of the particles in a manner that would substantially reduce the removal rate achieved by a CMP process that includes the particles.

Examples of reactive cationic compounds that can be incorporated into a silica particle to become chemically bonded to a silica particle include compounds that contain a reactive group that can be subjected to conditions that will cause the reactive group to bond to the silica particle. One example of such a reactive group is a silane group, with examples of reactive cationic compounds including nitrogen-containing (e.g., amino) silane and (phosphorus-containing) e.g., phosphonium silane compounds that can be reacted and chemically (covalently) bonded to surfaces of silane particles. Example nitrogen-containing compounds include amine-substituted silane compounds, meaning compounds that contain a reactive silane group and an amine group, which may be a primary amine, a secondary amine, a tertiary amine, or a quaternary ammonium group, each of which can be cationically charged at low pH.

A reactive cationic compound can be attached to a silica particle interior or surface, for example by causing a reactive silane group of the reactive cationic compound to become reacted with the silica particle at or below the particle surface. When attached to the particle, a cationic compound and particle can be represented as follows, for a primary amine group; a secondary or tertiary amine group, a quaternary ammonium group, and a phosphonium group:

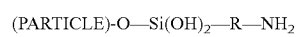

wherein R is a divalent linking group such as a divalent alkyl group, each of $R^1$, $R^2$, and $R^3$, is hydrogen or an alkyl substituent, and wherein at low pH the nitrogen atom or the phosphorus atom either is or becomes cationically charged.

Example silica particles that include a cationic compound at external surfaces of the particles are described, for example, in U.S. Pat. Nos. 7,994,057 and 8,252,687, these documents being incorporated herein by reference in their entireties. According to certain embodiments of particles that are surface-treated with reactive cationic compound, the amount of cationic compound reacted onto the silica particle surfaces can be from about 1 to about 15 percent, e.g., from about 3 to about 8 percent, measured as the amount of reactive cationic compound reacted to particle surfaces, per total silanol groups at the particle surfaces.

In alternate embodiments, a reactive or non-reactive cationic compound can be incorporated into interiors of silica abrasive particles, below outer particle surfaces. The cationic compound may be, for example, a nitrogen-containing compound or a phosphorus-containing compound, e.g., a reactive or non-reactive amine compound, ammonium compound, or a phosphonium compound. Examples of such interior-charged particles are described, for example, in Applicant's copending U.S. patent application Ser. No. 14/750,204, filed Jun. 25, 2015, the entirety of which is incorporated herein by reference.

According to embodiments of particles that contain cationic compound at particle interiors, a nitrogen-containing compound as the cationic compound can be an amine compound or an ammonium compound. When the cationic compound is a phosphorus-containing compound, it preferably includes a phosphine compound or phosphonium compound. Ammonium compounds may include $R^1R^2R^3R^4N^+$ and phosphonium compounds may include $R^1R^2R^3R^4P^+$, wherein each $R^1$, $R^2$, $R^3$, $R^4$ independently represents hydrogen, C1-C6 alkyl, a C7-C12 arylalkyl, or a C6-C10 aryl. These groups can be further substituted with one or more hydroxyl groups.

Example ammonium compounds include tetramethylammonium, tetraethylammonium, tetrapropylammonium, tetrabutylammonium, tetrapentylammonium, ethyltrimethylammonium, and diethyldimethylammonium. In certain embodiments, the ammonium compound is preferably not ammonia or ammonium ($NH^3$ or $NH^{4+}$). Example phosphonium compounds include tetramethylphosphonium, tetraethylphosphonium, tetrapropylphosphonium, tetrabutylphosphonium, tetraphenylphosphonium, methyltriphenylphosphonium, ethyltriphenylphosphonium, butyltriphenylphosphonium, benzyltriphenylphosphonium, dimethyldiphenylphosphonium, hydroxymethyltriphenylphosphonium, and hydroxyethyltriphenylphosphonium.

A nitrogen-containing cationic compound may also include other substances that include an amino group such as an amino acid, for example, an amino acid having from one to eight carbon atoms such as lycine, glutamine, glycine, iminodiacetic acid, alanine, valine, leucine, isoleucine, serine, and threonine.

Alternately cationic compound located internal to silica particles may be a reactive compound such as an aminosilane compound. Examples include primary aminosilanes, secondary aminosilanes, tertiary aminosilanes, quaternary aminosilanes, and multi-podal (e.g., dipodal) aminosilanes. The aminosilane compound may include substantially any suitable aminosilane, for example, a propyl group-containing aminosilane, or an aminosilane compound including a propyl amine. Examples of suitable aminosilanes may include bis(2-hydroxyethyl)-3-aminopropyl trialkoxysilane, diethylaminomethyltrialkoxysilane, (N,N-diethyl-3-aminopropyl)trialkoxysilane), 3-(N-styrylmethyl-2-aminoethyl-aminopropyl trialkoxysilane, aminopropyl trialkoxysilane, (2-N-benzylaminoethyl)-3-aminopropyl trialkoxysilane), trialkoxysilyl propyl-N,N,N-trimethyl ammonium chloride, N-(trialkoxysilylethyl)benzyl-N,N,N-trimethyl ammonium chloride, (bis(methyldialkoxysilylpropyl)-N-methyl amine, bis(trialkoxysilylpropyl)urea, bis(3-(trialkoxysilyl)propyl)-ethylenediamine, bis(trialkoxysilylpropyl)amine, bis(trialkoxysilylpropyl)amine, 3-aminopropyltrialkoxysilane, N-(2-aminoethyl)-3-aminopropylmethyldialkoxysilane, N-(2-Aminoethyl)-3-aminopropyltrialkoxysilane, 3-aminopropylmethyldialkoxysilane, 3-aminopropyltrialkoxysilane, (N-trialkoxysilylpropyl)polyethyleneimine, trialkoxysilylpropyldiethylenetriamine, N-phenyl-3-aminopropyltrialkoysilane, N-(vinylbenzyl)-2-aminoethyl-3-aminopropyltrialkoxysilane hydrochloride, 4-aminobutyltrialkoxysilane, and mixtures thereof. Those of ordinary skill will readily appreciate that aminosilane compounds are commonly hydrolyzed (or partially hydrolyzed) in an liquid carrier. Thus by reciting an aminosilane compound, it will be understood that the aminosilane and/or a hydrolyzed (or partially hydrolyzed) species and/or condensed species thereof may be incorporated in the colloidal silica abrasive particles.

Colloidal silica abrasive particles having an internal cationic compound that provides a positive charge may be fabricated, for example, by growing the abrasive particles in a liquid solution that contains the cationic compound such that the cationic compound becomes incorporated into at least a portion of the colloidal silica particles during growth thereof. Alternate embodiments of internal-charged colloidal silica particles may be prepared by treating a conventional colloidal silica particle with the cationic compound and then growing additional silica over the cationic compound to thereby cover the cationic compound with additional silica.

By one useful method, colloidal silica abrasive particles having an internal cationic compound may be prepared by (i) providing a liquid solution (e.g., including water at a predetermined pH) and (ii) combining the liquid solution with silica-producing compound and the cationic compound and causing colloidal silica particles to grow in the liquid solution such that a dispersion is obtained including colloidal silica particles having the cationic compound incorporated therein. The cationic compound may alternately be included in the liquid solution provided in (i). The silica-producing compound may include, for example, tetramethyl orthosilicate (TMOS), tetraethylorthosilicate (TEOS), silicic acid, an alkali or ammonium silicate, or a silicon tetrahalide. This method is similar to that disclosed in U.S. Pat. No. 8,529,787 in which TMOS is continuously added to a mother liquid including an alkali catalyst (the similarity is that a silica producing compound is combined with a liquid solution to produce colloidal silica particles).

The cationic compound may be added to the liquid solution in substantially any suitable amount sufficient to incorporate the cationic compound into the colloidal silica particles. The aqueous liquid solution may further optionally include an alkali catalyst, for example, including an ether amine, an ethylene amine, a tetraalkyl amine, an alcohol amine, or two or more of these. Suitable alkali catalysts may include an organic base catalyst such as ethylenediamine, diethylenetriamine, triethylenetetramine, ammonia, urea, monoethanolamine, diethanolamine, triethanolamine, tetramethylammonium hydroxide (TMAH), tetramethylguanidine, tetraethylammonium hydroxide, aminopropylmorpholine, hexyloxypropylamine, ethyloxypropylamine (EOPA), jeffamine HK-511, or combinations thereof. The alkali catalyst may alternatively or additionally include potassium hydroxide (KOH). The amount of alkali catalyst added may be selected so that the pH of the aqueous liquid solution is generally in the range from about 7 to about 14 and preferably in the range from about 9 to about 12.

The liquid solution may optionally further include colloidal silica particles that are intended to act as nucleation sites for growth of the colloidal silica. In such embodiments, the final colloidal silica may be thought of as having a core-shell structure (or a multi-layer structure) in which the core includes the colloidal silica particles originally added to the liquid solution, and the shell (the outer layer) includes the silica that is grown over the core and includes an internal cationic compound (such as an aminosilane).

By another method, cationic silica abrasive particles having an internal cationic compound may be prepared by (i) providing a high pH silicate solution (e.g., a sodium silicate or potassium silicate solution), (ii) processing the silicate solution to protonate the silicate anions and form silicic acid (e.g., by adding an acid to the solution or passing the solution through an ion exchange column) which in turn causes precipitation and growth of colloidal silica particles in a reaction vessel, and (iii) adding the cationic compound to the reaction vessel such that it becomes incorporated into the growing colloidal silica particles. The silicate solution preferably has a pH in the range from about 11 to about 13. The silicate solution may be passed through an ion exchange column into the reaction vessel, which tends to lower the pH to a value in a range from about 2 to about 5. The cationic compound may be added to the reaction vessel in substantially any suitable amount and at substantially any suitable rate such that a sufficient amount of the cationic compound is incorporated into the colloidal silica particles.

By yet another method, positively-charged colloidal silica abrasive particles may be prepared by treating (e.g., surface treating) conventional (e.g., uncharged) colloidal silica particles with cationic compound, and then growing additional silica over the treated colloidal silica (i.e., over the cationic compound). For example, a nitrogen-containing compound such as a quaternary amine compound or an aminosilane compound may be added to a colloidal silica-containing dispersion (e.g., as taught in U.S. Pat. Nos. 7,994,057 and 8,252,687). After sufficient time to allow the nitrogen-containing compound to become associated (e.g., chemically bonded or electrostatically associated) with the colloidal silica particles, a silica producing compound such as TMOS, TEOS, silicic acid, an alkali or ammonium silicate, or a silica tetrahalide may be added to the dispersion. The dispersion may be optionally heated (e.g., to 45 degrees C.) to accelerate further growth of the colloidal silica particles such that the cationic compound (the surface treatment agent) becomes incorporated into the particles at the particle interiors. Such positively-charged colloidal silica particles may be thought of as having a core and multiple layers or coatings over the core: a first inner layer of the cationic compound on the core (i.e., the cationic compound-treated colloidal silica core), and an outer layer of silica deposited over the cationic compound, thereby placing the cationic compound at an interior location of the particle.

Cationic silica abrasive particles may be of any useful particle size, which as used herein refers to average particle size of "aggregate" particles (also referred to as "secondary particles") measured using a dynamic light scattering (DLS) tool such as the Zetasizer® available from Malvern Instruments® (Worcestershire, UK). Particle size can be selected based on factors of the CMP process for which the slurry will be used, including other ingredients of the slurry, the type of substrate, surface properties of the substrate, type of pad, processing conditions, etc. Example DLS particle sizes of cationic silica abrasive particles for use in processing a nickel layer as described herein can be at least about 50 nanometers (nm) or more (e.g., about 70 nm or more, or about 100 nm or more. Accordingly, the abrasive particles may have an average particle size (aggregate size) in a range from about 50 nm to about 200 nm, e.g., from about 70 nm to about 190 nm, or from about 100 nm to about 180 nm).

The slurry can include any suitable amount of the cationic silica abrasive particles. Example slurries may include at least about 1 weight percent cationic silica particles, e.g., at least about 2 weight percent, based on total weight slurry, at the point of use. A slurry may include up to about 12 weight percent, or up to about 10 weight percent, or up to about 7 or 8 weight percent cationic silica particles based on total weight slurry, at the point of use.

Exemplary colloidal silica particles, in the slurry, at a low slurry pH, may have a positive charge of about 5 millivolts (mV) or more, such as about 10 mV or more, about 15 mV or more, about 20 mV or more, about 25 mV or more, or about 30 mV or more), when in the slurry, e.g., a positive charge of about 50 mV or less, such as about 45 mV or less, about 40 mV or less, or about 35 mV or less.

The cationic charge of the silica abrasive particles may be permanent, meaning that the charge is not readily removed or substantially reduced (when pH is maintained at a constant level) by flushing, dilution, filtration, or the like, of a slurry or of the particles. A permanent cationic charge may be achieved, for example, by incorporating the cationic compound into the interior portion of silica particles, below an outer surface of the particle, or by incorporating cationic compound at surfaces of silica particles by chemically reacting cationic compound silica particle surfaces. A permanent charge is distinct from a non-permanent, reversible cationic charge that may result, for example, from mere electrostatic interaction between silica abrasive particle and a non-reactive cationic compound such as a salt that is present in a liquid carrier of an abrasive slurry, for example a quaternary ammonium salt, a phosphonium salt, a sulfonium salt, an imidazolium salt, or a pyridinium salt. See, e.g., U.S. Pat. Nos. 9,127,187, and 9,309,442, the entireties of which is incorporated herein by reference, describing colloidal silica particles that are permanently charged.

Preferred cationic silica particles are colloidally stable. The term colloid refers to the suspension of abrasive particles in a liquid carrier such as water or an aqueous carrier. Colloidal stability refers to the maintenance of that suspension for a useful period of time. In the context of the present description, silica particles are considered to be colloidally stable if, when a slurry of the silica particles in a liquid carrier are placed in a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., $\{[B]-[T]\}/[C] \leq 0.5$). More preferably, the value of $[B]-[T]/[C]$ is less than or equal to 0.3, and most preferably is less than or equal to 0.1.

The cationic particles can be useful either alone or with one or more other types of abrasive particles in a slurry for use in chemical mechanical processing, for example in processing a nickel layer such as electroless NiP. The slurry includes cationic silica abrasive particles as described suspended in a liquid carrier, at a low pH, such as a pH not greater than 3, e.g., not greater than 2. In addition, a slurry useful for processing a nickel layer surface can include oxidizer, metal ion catalyst capable of reversible oxidation and reduction in the presence of nickel-phosphorus and the oxidizing agent (e.g., the metal ion being an ion of iron, cobalt, copper, europium, manganese, tungsten, molybdenum, rhenium and iridium; preferably iron and preferably $Fe^{3+}$), an optional catalyst stabilizing agent, an optional nickel complexing agent, and optional abrasive particles that are not cationic silica abrasive particles that include cationic compound incorporated therein.

The liquid carrier facilitates application of the abrasive particles and chemical ingredients of the slurry to a surface of a substrate being processed, e.g., polished, planarized, etc. The liquid carrier may be any suitable carrier (e.g., solvent) such as a lower alcohol (e.g., methanol, ethanol, etc.), ether (e.g., dioxane, tetrahydrofuran, etc.), water, or a mixture thereof. Preferably, the liquid carrier comprises, consists essentially of, or consists of water, more preferably deionized water. A carrier that consists essentially of water can contain up to (not more than) 3, 2, 1, 0.5, 0.1, or 0.05 weight percent non-water solvent such as a lower alcohol (e.g., methanol, ethanol, etc.), ethers (e.g., dioxane, tetrahydrofuran, etc.).

The slurry is acidic during use in a CMP process, having a pH of not greater than about 3, e.g., not greater than about 2. A low pH of a slurry may be achieved or maintained by any suitable means. The slurry may include substantially any suitable pH adjusting agents or buffering systems. For example, suitable pH adjusting agents include organic and inorganic acids such as nitric acid, sulfuric acid, phosphoric acid, phthalic acid, citric acid, adipic acid, oxalic acid, malonic acid, maleic acid, etc.

The slurry may optionally and preferably include oxidizing agent. Oxidizing agent may be added to the slurry during the slurry manufacturing process or just prior to a CMP operation (e.g., in a tank located at point of use, such as at a semiconductor fabrication facility). Exemplary oxidizing agents include inorganic and organic per-compounds. A per-compound as defined by Hawley's Condensed Chemical Dictionary is a compound containing at least one peroxy group (—O—O—) or a compound containing an element in its highest oxidation state. Examples of compounds containing at least one peroxy group include hydrogen peroxide and its adducts such as urea hydrogen peroxide and percarbonates, organic peroxides such as benzoyl peroxide, peracetic acid, and di-t-butyl peroxide, monopersulfates ($SO_5^=$), dipersulfates ($S_2O_8^=$), and sodium peroxide. Examples of compounds that contain an element in its highest oxidation state include periodic acid, periodate salts, perbromic acid, perbromate salts, perchloric acid, perchlorate salts, perboric acid, and perborate salts and permanganates. An often-preferred oxidizing agent is hydrogen peroxide.

Oxidizing agent may be included in a slurry in any useful amount, including an amount useful to provide a desired removal rate of nickel material from a surface of a nickel layer. Exemplary amounts can be in a range from about 0.1 to about 10 weight percent based on total weight slurry, such as from about 0.1 to about 6 weight percent (e.g., from about 0.2 to about 5 weight percent, from about 0.3 to about 4 weight percent, or from about 0.5 to about 3 weight percent).

A metal ion catalyst optionally included in the slurry is a compound that contains a metal ion that is capable of reversible oxidation and reduction in the presence of nickel-phosphorus and an oxidizing agent (e.g., hydrogen peroxide). Any suitable metal ion catalyst may be used. Preferred metal ions include ions of iron, cobalt, copper, europium, manganese, rhenium, molybdenum, iridium and tungsten. Non-limiting examples of such metal ions include $Fe^{2+}$, $Fe^{3+}$, $Co^{2+}$, $Cu^{2+}$, $Eu^{3+}$, $Mn^{2+}$, $W^{6+}$, $Re^{7+}$, $Mo^5+$ and $Ir^{3+}$. Preferably, the metal ion is or comprises $Fe^{3+}$. Typically, the metal ion is included in the CMP composition as a soluble salt, for example, a nitrate, a halide (e.g., chloride), a sulfate, or the like.

The metal ion catalyst may be present in the slurry (at point of use) at a concentration of greater than about 1 ppm (e.g., about 5 ppm, about 10 ppm, about 20 ppm, about 50 ppm, about 100 ppm). The metal ion catalyst is, preferably, present in the composition (at point of use) at a concentration of less than about 1000 ppm (e.g., about 750 ppm, about 500 ppm, about 250 ppm, about 150 ppm, about 125 ppm). The metal ion catalyst may be present in the composition (at point of use) at a concentration range bounded by any of the aforementioned concentrations, for example, about 1 to about 1000 ppm, preferably about 20 to about 250 ppm, e.g., about 50 to about 150 ppm.

The slurry may optionally contain a catalyst stabilizing agent, which can function chemically with materials of the slurry and the substrate to improve a rate of removal of material from a substrate, e.g., by chelating (to a stabilizing degree) a metal ion of a metal ion catalyst. Example catalyst stabilizing agents include organic compounds that include two or three carboxylic acid substituents, and that are capable of chelating with a metal ion of a metal ion catalyst also present in the slurry. Non-limiting examples include oxalic acid, malonic acid, succinic acid, malic acid, tartaric acid, citric acid, glutaric acid, adipic acid, maleic acid, phthalic acid and iminodiacetic acid. See United States Patent Publication 2015/0152289, the entirety of which is incorporated herein by reference. The term "carboxylic acid" refers to the free acid form as well as a salt of a carboxylic acid (e.g., alkali metal salts).

Catalyst stabilizing agent can be present at a concentration of about 0.001 to about 2 weight percent, based on total weight slurry (at a point of use), e.g., from about 0.03 to about 0.4 weight percent, or from about 0.04 to about 0.2 weight percent based on total weight slurry at a point of use. Alternately stated, catalyst stabilizing agent can be present at a molar concentration that is at least twice the molar concentration of the metal ion (e.g., 2 to 20 times the metal ion molar concentration, preferably about 2 to 10, or 2 to 5 times the metal ion molar concentration).

The slurry may optionally contain a nickel complexing agent, which can function chemically with materials of the slurry and the substrate to improve removal rate, e.g., by stabilizing nickel ions in the slurry after removal of the ions from a substrate surface. Without wishing to be bound by theory, it is believed that a nickel complexing agent in the slurry can facilitate removal of the nickel by complexing with nickel ions in the slurry that are formed during the removal process. Useful nickel-complexing agents include amino acids and carboxylic acids, including glycine, alanine, aspartic acid, histidine, nitriloacetic acid, iminodiacetic acid, acetic acid, tartaric acid, citric acid, oxalic acid, lactic acid, glutaric acid, maleic acid, gluconic acid, malonic acid and glycolic acid. Nickel-complexing agent may be included in a slurry in any useful amount, for example in an amount of about 0.3 to about 6 weight percent, for example from about 0.3 to about 1 weight percent, based on total weight slurry, at a point of use.

The slurry may also include a second type of abrasive particle (referred to as "second particles" or "secondary particles") that may be different in chemical composition, size, or charge (e.g., zeta potential) relative to the cationic silica particles described herein. Secondary particles may be of silica, alumina, or another material useful in abrasive particles for chemical mechanical processing, such as for processing a nickel surface.

If present, an amount of alumina abrasive particles may be included in a slurry to increase a removal rate of material from a substrate surface. The amount of alumina particles present in these slurry embodiments can be less than 30 weight percent, e.g., less than 20 weight percent, or less than 10 weight percent alumina abrasive particles based on total weight abrasive particles in the slurry.

In other embodiments, a slurry can include no alumina particles or a very small (e.g., insignificant) amount of alumina particles, for example not more than 3, 2, or 1 percent, e.g., not more than 0.5, 0.1, 0.05, or 0.01 alumina particles, based on total weight abrasive particles in the slurry. These slurries, especially slurries with no alumina particles, can be referred to as "no-alumina" slurries and can be desired and advantageous because the absence of alumina abrasive particles eliminates the potential for embedded alumina particle defects, and higher levels of substrate scratching that can be associated with the use of alumina abrasive particles.

These and other slurry embodiments can also include secondary abrasive particles that are not alumina, that are silica, but that are different from the charged silica particles described herein (that contain cationic compound incorporated into the silica particles). These particles be referred to as "secondary silica abrasive particles" or "secondary silica particles. And, because these particles do not include a cationic compound incorporated into the particles, these particles may also be referred to as "non-cationic compound-containing silica particles." The secondary silica particles may still become charged (e.g., cationically) and exhibit a measurable zeta potential (positive or negative) at a low slurry pH, or may be relatively uncharged (exhibit a neutral charge) at slurry pH.

Secondary silica particles can be of any desired size. Example DLS particle sizes of secondary silica abrasive particles can be at least about 50 nanometers (nm) or more (e.g., about 70 nm or more, or about 100 nm or more. Accordingly, secondary silica particles may have an average particle size (aggregate size) in a range from about 50 nm to about 200 nm, e.g., from about 70 nm to about 190 nm, or from about 100 nm to about 180 nm).

According to example "silica-only" slurries, abrasive particles of a slurry can consist of or consist essentially of cationic silica particles as described, which include a cationic compound incorporated into the particles, and optional secondary silica particles ("non-cationic compound-containing silica particles"), and can contain not more than 3, 2, or 1 percent, e.g., not more than 0.5, 0.1, 0.05, or 0.01 non-silica particles, based on total weight abrasive particles in the slurry. The amount of the secondary silica particles ("non-cationic compound-containing silica particles") relative to the cationic silica particles (cationic compound-containing silica particles) can be as desired, with example amounts being in a range of from 1 to 50 weight percent, e.g., from 5 to 40 or from 10 to 30 weight percent secondary silica abrasive particles based on total silica particles (and total abrasive particles) in the slurry.

Still other slurry embodiments do not include any secondary particles and include only cationic silica particles as described; the cationic silica particles may all be the same, or the slurry may include different types of cationic silica particle, meaning cationic silica particles that differ in the type of cationic compound incorporated in the particles, their particle size, or the mode of synthesis or preparation of the particles. These slurries can exclude entirely, or may include not more than a low or very low level of abrasive particles that are not cationic silica particles as described herein. Stated differently, the slurry can contain abrasive particles that include not more than a small or insubstantial amount of abrasive particles that are not cationic silica particles as described; i.e., the abrasive particles of the slurry can consist of or consist essentially of the cationic silica abrasive particles. As used herein, a slurry that contains abrasive particles "consisting essentially of" cationic silica particles refers to a slurry that does not contain more than a low amount or an insubstantial amount of any other type of abrasive particles, e.g., not more than 3, 2, 1, 0.5, 0.1, 0.05, or 0.01 weight percent of another type of abrasive particle based on total weight abrasive particles in the slurry.

Abrasive particles of the slurry, whether the cationic silica particles or secondary abrasive particles, can optionally be aggregated, non-aggregated, or both. Non-aggregated particles are individual particles that may be spherical or nearly spherical in shape, but can have other shapes as well such as generally elliptical, square, or rectangular cross-sections. Non-aggregated particles can be referred to as primary particles. Aggregated particles are particles in which multiple discrete primary particles, not too many in number (e.g., 2, 3, 4, or 5 primary particles), have become clustered or bonded together to form a single (aggregate) particle from the multiple primary particles, the single particle having a generally irregular shape.

A slurry as described may be prepared by known methods, such as by combining ingredients or components as described, with mixing, to provide a liquid slurry of the abrasive particles uniformly suspended in a liquid carrier, which is preferably a uniform solution. Useful methods of preparation include batch, semi-batch, and continuous process. Generally, the slurry may be prepared by combining the components thereof in any order with sufficient mixing to provide uniformity.

Oxidizing agent, may, if desired, be added at any time during the preparation of the slurry. For example, the slurry containing oxidizing agent may be prepared and sold and delivered for commercial use with oxidizing agent present in the slurry. Alternately, the slurry may be prepared, sold, and delivered, as a slurry that does not contain oxidizing agent. The slurry without oxidizing agent may be transported, stored, and delivered before commercial use without the oxidizing agent being added. Shortly before using the slurry in a CMP process, e.g., at or just prior to a point of use, oxidizing agent may be added, for example within about 1 minute, or within about 10 minutes, or within about 1 hour, or within about 1 day, or within about 1 week of the CMP operation. The slurry may also be prepared by mixing the components at the surface of the substrate (e.g., on the polishing pad) during the CMP operation.

Many commercial slurry products are provided in the form of an abrasive particle slurry concentrate that is intended to be diluted with an appropriate amount of water to form a "use composition" or "point of use slurry" before use in CMP processing, e.g., by an end user of the slurry, optionally at or near a point of use. In these embodiments, the abrasive particle slurry concentrate may include the abrasive particles in a liquid medium, either alone or in combination with one or more other components of the slurry as desired at a point of use.

In certain embodiments of slurry products for processing a hard disk, a first concentrate that contains the abrasive particles (i.e., an abrasive particle slurry concentrate) may be provided in a first package, with some or all of the other components of a point of use slurry being provided separately. Some or all of the non-abrasive particle components may be provided separately, e.g., in a second composition such as a "chemistry concentrate" that may be in a separate (second) package and may also optionally be in a concentrated form. The second concentrate in the second package (e.g., a "chemistry pack") may include acid, metal ion catalyst, stabilizer, etc., in relative amounts that can be combined with the abrasive particle slurry concentrate and water to produce a point of use slurry. Optionally, oxidizer (e.g., hydrogen peroxide) can also be included in a first or a second concentrate, but oxidizer may also be added as a separate component to the point of use slurry, at the point of use. Advantageously, the abrasive particles in a first package, separated from one or more of the other components of a point of use slurry, can exhibit desired stability and shelf life that may be diminished if the abrasive particles were included at a high concentration in a concentrate, especially when combined with acid such that the concentrate is at a low pH.

The amounts of abrasive particles and other optional components in a concentrate can be amounts that, upon dilution of the concentrate with an appropriate amount of water, each component of the slurry may be present in the slurry at the point of use, in an amount within a range recited herein for that component.

For example, abrasive particles (optionally also other components of a point of use slurry) may be present in a concentrate in an amount that is about 2 times (e.g., about 3 times, about 4 times, about 5 times, or even about 10 times) greater than a concentration of abrasive particles (or other component) specified herein, so that when the concentrate is diluted with one equal volume of water (alternately 2, 3, 4, or even 9 equal volumes of water, respectively), the abrasive particles (or other component) will be present in the slurry in an amount within the ranges set forth herein. The concentrate can also contain an amount of water that will ensure that other components are at least partially or fully dissolved in the concentrate.

In one embodiment of an abrasive particle slurry concentrate, the concentrate can include at least 5, 10, 20, or even up to 25, 30, 40, or about 50 weight percent abrasive particles dispersed in a water-based liquid carrier. Optionally, this concentrate can include low amounts or none of any of the other components of a point of use slurry, such as, independently, less than 2, 1, 0.5, or 0.1 weight percent of metal ion catalyst, stabilizing agent, or oxidizer, based on total weight concentrate. Not containing acid, the pH of this concentrate can be above 3 or above 4, e.g., from 6 to 11.

In one embodiment of a second concentrate, such as a chemistry concentrate that need not contain abrasive particles, the concentrate can include one or a combination of acid, metal ion catalyst, stabilizer, etc., in relative amounts that can be combined with the abrasive particle slurry concentrate and water to produce a point of use slurry. Optionally, this concentrate can include low amounts or none of any of the other components of a point of use slurry, such as, independently, less than 2, 1, 0.5, or 0.1 weight percent abrasive particles or oxidizer, based on total weight concentrate.

According to methods of using a concentrate an abrasive particle slurry concentrate can be combined with water and a second concentrate (e.g., a chemistry concentrate) at a point of use. Upon combining the concentrate or concentrates with water (e.g., DI water) and oxidizer (e.g., hydrogen peroxide) at the point of use, the point of use slurry will contain amounts of ingredients such as from 4-10 weight percent cationic silica abrasive particles, and have a pH in a range from 1-3, with the particles having a positive zeta potential.

A slurry as described may be useful for chemical mechanical processing (planarizing, polishing, etc.) a substrate at any of various stages of manufacture. Example slurries can be useful in processing a non-magnetic nickel layer of a hard disk product or precursor, such as a hard magnetic disk component useful in a computer disk drive. Hard magnetic disks typically include a non-magnetic substrate base made of a flat and rigid non-magnetic material such as aluminum, glass, glass-ceramic, or another similar material. Different functional layers are applied to the base, one of which is a magnetic storage layer. Another common layer is a non-magnetic nickel layer, e.g., NiP, e.g., "electroless" nickel, which is present to provide hardness or strength to the multi-layer disk structure. Other layers may vary, with examples including one or more "underlayers" sputtered onto the plated Ni; one or more magnetic (e.g., cobalt alloy) layers sputtered onto an underlayer; a carbon protective overcoat sputtered onto a magnetic layer; and one or more lubricant layer deposited on the carbon.

The nickel layer, which is non-magnetic and amorphous, provides a strong and hard base for added magnetic and other layers. See, e.g., U.S. Pat. Nos. 6,977,030, and 6,159,076, describing hard magnetic disks used in computer disk drives (the entireties of which are incorporated herein by reference). Example nickel layers can be made of nickel phosphorus (NiP), e.g., "electroless nickel" or "electroless NiP," as those terms are known and understood in the hard disk manufacturing arts to include layers that consist of or consist essentially of nickel and phosphorus and are commonly applied to a rigid hard disk substrate by an electroless method. The nickel layer can be applied by electroless nickel plating methods, which are known, followed by an optional annealing step at high temperature.

The nickel layer as applied typically contains only nickel and phosphorus, e.g., at least 95, 99, or 99.5 weight percent nickel and phosphorus. The amount of phosphorus relative to the amount of nickel can be as low as about 1 percent (atomic) phosphorus and as high as about 20 percent (atomic) phosphorus based on the total amount (atomic) of nickel and phosphorus. For hard memory disk applications, the amount of phosphorus is typically at least 10 percent (atomic), e.g., from about 10 to about 12 or 14 percent (atomic) phosphorus based on the total amount (atomic) of nickel and phosphorus in the nickel layer. See, e.g., U.S. Pat. No. 6,977,030, describing features of electroless nickel layers.

After placing the nickel layer onto the substrate, added layers are placed over the nickel layer. But before placing those subsequent layers, the nickel layer surface must first be processed to a smooth and uniform surface that contains a low level of defects (e.g., scratches or embedded abrasive particles). A highly uniform, smooth, and low roughness surface of the nickel layer is required for reliable performance of the hard disk.

According to the present description, processing a nickel layer surface to provide a smooth and uniform surface having a low level of defects can be performed by chemical-mechanical processing using a slurry as described, that includes cationic silica particles as described, which include cationic compound incorporated into the particles. A useful CMP process can involve a CMP apparatus having a platen, which, in use, is in motion and has a velocity that results from orbital, linear, or circular motion. A polishing pad contacts the platen and moves with the platen. A carrier holds a substrate to be polished by contacting and moving a surface of the substrate relative to a surface of the polishing pad. Processing of the substrate surface takes place by the substrate being placed in contact with the polishing pad and the abrasive slurry while the polishing pad moves relative to the substrate surface to abrade at least a portion of the substrate surface. The carrier of the CMP apparatus provides controllable pressure on the substrate, pressing the substrate against the polishing pad. Relative motion of the substrate and pad abrades and removes material from the surface of the substrate. Removal of material from the substrate surface may be based on the combined effects of the chemical activity of the slurry (e.g., by catalyst, oxidizing agent, etc., present in the slurry), and the mechanical activity of the pad and the abrasive particles suspended in the slurry.

A CMP process may be performed using any suitable polishing pad (e.g., polishing surface). Suitable polishing pads include, for example, woven pads, non-woven polishing pads, polymeric (e.g., foam) polishing pads, and the like, many examples of which are known and commercially available. Pads suitable for processing a nickel-phosphorus surface can be constructed of suitable polymers of desired density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

According to preferred embodiments of slurries and CMP processes that involve a slurry with cationic silica abrasive particles as described (containing incorporated cationic compound), a nickel layer can be processed by CMP processing in a manner that produces a relatively high removal rate of the nickel material (e.g., NiP, electroless nickel) as compared to a CMP process that treats an identical substrate using identical CMP conditions, but with a comparable slurry, wherein the comparable slurry is identical to an inventive slurry except that the abrasive particles of the comparable slurry are uncharged (i.e., neutral) silica particles or anionically-charged silica particles. For example, according certain embodiments of the inventive methods a removal rate of NiP (using an inventive slurry) can be greater than a removal rate of a similar method wherein the substrate, CMP equipment and process parameters, slurry, and abrasive particles are the same except that the abrasive particles in the similar method exhibit a zeta potential of not greater than zero, as compared to an inventive method wherein the silica particles are the same but exhibit a positive zeta potential, such as a zeta potential of at least 5 millivolts.

Without wishing to be bound by theory, it is postulated that a nickel-phosphorus surface (e.g., containing a relatively high level of phosphorus, such as at least 8 or 10 atomic percent phosphorus versus total nickel and phosphorus), during chemical-mechanical processing in the presence of an oxidizing agent, can become negatively charged at the surface. Cationic silica particles in a CMP slurry used to process this surface are believed to be attracted to the negatively charged surface, and this attraction is believed to improve removal rate of the nickel-phosphorus material at the surface in a manner that does not occur if the silica abrasive particles are either un-charged or anionically charged in the CMP slurry (all other features of the CMP process and materials being otherwise identical).

As a starting material for CMP processing, the nickel layer can be a layer of nickel material (e.g., NiP, electroless NiP) deposited onto a base substrate, optionally following a step of annealing the deposited nickel layer (for stress relief, at elevated temperature of at least about 200 degrees Celsius), but prior to any step of processing the surface to remove, planarize, or polish the nickel layer surface (i.e., the "deposited" nickel layer surface). This deposited nickel layer surface will have surface properties that must to be improved before a subsequent layer of material can be added.

For example, prior to processing by chemical mechanical processing, a deposited nickel layer surface may have a micro-waviness of at least about 30 angstroms, measured by incidence interferometry, such as by using a Zygo NewView 100 wafer inspection device from Zygo Corp. (Middlefield, Conn.), at 80-500 µm wavelength. Microwaviness is linearly correlated with surface roughness, which can be determined using optical or physical techniques.

According to various methods of CMP processing, a deposited nickel layer may typically be processed by multiple substantially discrete CMP processing steps, in preparing the surface for processing by adding another layer of material onto the nickel layer. More preferably, a single CMP step would be desirably capable of processing the deposited nickel layer to a surface that has surface properties that are sufficiently uniform and smooth that a subsequent layer of a hard disk product can be applied; but as a practical matter, multiple steps are often used in current manufacturing processes, including: a first step that is a relatively aggressive step that performs at a relatively high removal rate, followed by one or more subsequent ("fine" or "polishing") steps that provide a desirably smooth and uniform surface.

In more detail, a method that includes more than one planarization, polishing, or CMP processing step includes what can be referred to as a "first step" performed on a surface of the deposited nickel layer (e.g., NiP, electroless NiP), meaning a first such step (CMP, polishing, or planarization) that is performed after the nickel layer is deposited onto a base substrate, or following an optional step of annealing the nickel layer after deposition of the nickel layer. A "first step" requires a relatively high removal rate of the NiP material to achieve high manufacturing throughput of the multi-layer hard disk structure. To achieve a sufficiently high removal rate in a first step, abrasive particles included in the slurry are often chosen to include relatively hard particles such as aluminum particles. But hard particles such as alumina tend to produce undesirably high levels of scratching and the possibility of embedded particle defects. To avoid scratching and embedded particle defects, the amount of aluminum particles in a slurry for processing a NiP substrate may desirably be reduced or eliminated. Desirably, the micro-waviness of the nickel layer surface may be reduced to a value of from about 2 to about 5 angstroms after a "first step."

A slurry as described herein can provide a removal rate of NiP that is sufficiently high to allow for use of the slurry in a first step of processing a deposited NiP surface, even with reduced levels of alumina particles in the slurry or with no alumina particles. Accordingly, as mentioned previously herein, a useful slurry for processing a nickel-phosphorus surface (even in a first step of processing a deposited nickel layer) may contain a relatively low amount of alumina particles (e.g., less than 30 weight percent, e.g., less than 20 weight percent, or less than 10 weight percent, based on total weight abrasive particles in the slurry) and may be an "alumina-free" slurry that contains not more than 3, 2, or 1 percent, e.g., not more than 0.5, 0.1, 0.05, or 0.01 alumina particles based on total weight abrasive particles in the slurry. These slurries, especially slurries with no alumina particles, can be referred to as "no-alumina" or "alumina-free" slurries, and can be desired and advantageous because the absence of alumina abrasive particles eliminates the potential for embedded alumina particle defects and higher levels of scratching.

Following a "first step" of a multi-step process, one or more subsequent, different, CMP processing steps can be performed to provide a fine (polished) finish. The subsequent steps perform at a lower removal rate relative to the first step. An inventive slurry as described herein can also be useful in any such subsequent step. Relative to a "first step," a subsequent "fine" step or "polishing" step may be performed using a relatively softer CMP pad that may include a smaller pore size compared to a pad used in a first step. The pressure used during a subsequent step may be slightly lower compared to the pressure used in a first step. Also, a first step may use a slurry that includes relatively larger abrasive particles, compared to a subsequent (fine) step. Desirably, the micro-waviness of the nickel layer surface may be reduced to a value of less than about 1.2 angstroms after one or more subsequent (fine, or polishing) CMP steps.

The advantages of the CMP compositions as described present invention are illustrated in the following examples, which demonstrate useful or advantageous features of inventive compositions.

EXAMPLES

Experimental Procedure

For experiment #1 (see Table 1), all NiP disks were polished using a 6EE DOUBLE SURFACE POLISHMETER (from Strasbaugh, San Jose, Calif.). Twenty five disks were polished in each run at a slurry flow rate of about 600 mL/min with a CR200 polishing pad (from Ceiba Technologies, Chandler Ariz.), at a down force of about 130 kg, an upper platen speed of about 23 revolutions-per-minute (rpm), a lower platen speed of about 28 rpm, and a carrier speed of about 5 rpm.

For experiment #2 (see Table 2), all NiP disks were polished using a 16B DOUBLE SURFACE POLISHMETER (from Speedfam). Thirty disks were polished in each run at a slurry flow rate of about 500 mL/min with a CR200 polishing pad, at a down force of about 280 kg, an upper platen speed of about 18 revolutions-per-minute (rpm), a lower platen speed of about 30 rpm, and a carrier speed of about 9 rpm.

In each experiment, weight measurements were made on five disks to determine the material removal rates (RR in mg/min). The slurries comprised (a) abrasive (variable); (b) hydrogen peroxide (variable); (c) salt (variable); and (e) nitric acid or phosphoric acid (variable for pH adjustment), as shown at Tables 1 and 2. As used herein, "variable" refers to varying the amount or identity of the specified component, and in some cases, the absence of the specified component in the slurry composition.

Colloidal silica particles PL-3, PL-3-D and PL-3-Cation with DLS (Dynamic Light Scattering) particle size of ~60-70 nm and different surface charge were purchased from Fuso Chemical Co, Ltd. See Table 1. Bindzil SP599L silica particles with DLS particle size of about 110-130 nm were purchased from Akzo Nobel. See Table 2. Snowtex CZL silica particles with DLS particle size of about 190-200 nm were purchased from Nissan Chem. See Table 2.

Silane coupling agents aminopropyltrimethoxysilane (APTMS) and 3-(trihydroxysilyl)-1-propanesulfonic acid (THSPS) were purchased from Sigma Aldrich and Gelest Inc., respectively. Positive charge modified Bindzil SP599L (Binzil SP599L+) was synthesized by gradually (i.e. about 10 g/min) adding APTMS to the raw Bindzil SP599L particles, with a dosage ratio targeting about 7.6% replacement of surface silanol of the raw silica particles, and stirring for at least 2 hours at room temperature or elevated temperature up to 60° C. Negative charge modified Bindzil SP599L (Binzil SP599L-) was synthesized by gradually (i.e., about 10 g/min) adding freshly neutralized THSPS (with NaOH to pH about 7-8) to the raw Bindzil SP599L particles, with a dosage ratio targeting about 5% replacement of surface silanol of the raw silica particle and stirring for at least 2 hours at room temperature or elevated temperature up to 60° C.

DLS particle size and surface charge of particles were measured using Malvern Zetasizer apparatus.

Results and Discussion

Polishing results listed in Table 1 show that commercially obtained, positively charged silica abrasive particles made via silane coupling reaction with amino-silane (by an external supplier of the silica abrasive particles) has a higher removal rate (RR) compared to unmodified or neutral silica particles and negatively charged silica particles.

TABLE 1

| | Silica (solid loading) | Oxidizer (1.2 wt %) | pH adjustor | pH | Zeta potential (mV) | RR (mg/min) |
|---|---|---|---|---|---|---|
| Experiment 1 | PL-3 (10%) | $H_2O_2$ | $HNO_3$ | 1.3 | −1.4 | 6.58 |
| | PL-3-D (10%) | $H_2O_2$ | $HNO_3$ | 1.3 | −31.9 | 4.88 |
| | PL-3-Cation (10%) | $H_2O_2$ | $HNO_3$ | 1.3 | 18.7 | 7.33 |

Polishing results listed in Table 2, For the in-house silane-modified Bindzil SP599L cationic particles show that positively charged silica abrasive particles being used as either sole or primary abrasive particles (along with secondary silica particles (Snowtex CZL) also result in a higher RR compared to unmodified or neutral silica and negatively charged silica.

TABLE 2

| | Primary Silica (solid loading) | Secondary Silica (solid loading) | Oxidizer (1.2 wt %) | pH adjustor | pH | Salt (wt %) | Zeta potential (mV) | RR (mg/min) |
|---|---|---|---|---|---|---|---|---|
| Experiment 2 | Bindzil SP599L (5.5%) | — | $H_2O_2$ | $H_3O_4$ | 1.5 | $K_2SO_4$(1.15%) | −1.8 | 32.7 |
| | Bindzil SP599L+ (5.5%) | — | $H_2O_2$ | $H_3O_4$ | 1.5 | $K_2SO_4$(1.15%) | 10.3 | 37.08 |
| | Bindzil SP599L− (5.5%) | — | $H_2O_2$ | $H_3O_4$ | 1.5 | $K_2SO_4$(1.15%) | −11.1 | 33.05 |
| | Bindzil SP599L (4.62%) | Snowtex CZL (0.88%) | $H_2O_2$ | $H_3O_4$ | 1.5 | $K_2SO_4$(1.15%) | −2.0 | 35.77 |
| | Bindzil SP599L+ (4.62%) | Snowtex CZL (0.88%) | $H_2O_2$ | $H_3O_4$ | 1.5 | $K_2SO_4$(1.15%) | 7.2 | 40.35 |
| | Bindzil SP599L (5.5%) | — | $H_2O_2$ | $H_3O_4$ | 1.5 | $K_2SO_4$(1.15%) | −1.8 | 33.53 |

Static etching rates (SER) of different surface charged Bindzil SP599L silica particles as listed in Table 3 show that SER decreases as particle charge (i.e., zeta potential) increases, with constant pH: negatively charged silica particles produce a higher static etch rate relative to unmodified/neutral silica particles, and unmodified/neutral silica particles produce a higher static etch rate relative to positively charged silica particles, for both slurries with and without $H_2O_2$. The post-etching and rinsing disk surface finishing was evaluated (data not shown). It was found that only positively charged silica leave a visible silica stain on the disk surface, while the other two types of silica have no such stain left on the disk surface. These results indicate that the positively charged silica abrasive particles are electrostatically attracted to the surface of the NiP disk, while the uncharged and negatively charged silica abrasive particles are not. Such attractive force may result in a closer particle-to-disk contact during polishing, and hence improve RR.

TABLE 3

| Silica (solid loading) | Oxidizer | pH adjustor | pH | Static Etch Rate (mg/hr) |
|---|---|---|---|---|
| Bindzil SP599L (5%) | $H_2O_2$ 1.2% | $HNO_3$ | 1.6 | 1.92 |
| Bindzil SP599L+ (5%) | $H_2O_2$ 1.2% | $HNO_3$ | 1.6 | 1.72 |
| Bindzil SP599L− (5%) | $H_2O_2$ 1.2% | $HNO_3$ | 1.6 | 2.1 |
| Bindzil SP599L (5%) | — | $HNO_3$ | 1.6 | 0.16 |
| Bindzil SP599L+ (5%) | — | $HNO_3$ | 1.6 | 0.13 |
| Bindzil SP599L− (5%) | — | $HNO_3$ | 1.6 | 0.21 |

CONCLUSION

Abrasive slurry compositions that contain positively charged silica abrasive particles show improved removal rate during NiP polishing compared to comparative slurries that are identical other than by the comparative slurries containing neutral or negatively charged silica, in otherwise identical polishing procedures of an identical substrate.

The invention claimed is:

1. A method of treating a nickel-phosphorus surface at a low pH, the method comprising:
providing a substrate having a nickel-phosphorus surface,
providing a slurry having a pH below 3, the slurry comprising:
liquid carrier,
cationic silica abrasive particles dispersed in the liquid carrier, the cationic silica abrasive particles containing cationic compound that is a nitrogen-containing compound or a phosphorus-containing compound, wherein the silica abrasive particles exhibit a zeta potential in a range from 5 to 60 millivolts in the slurry at the slurry pH, and
oxidizing agent, and
contacting the substrate surface with the slurry to remove nickel-phosphorus material from the surface.

2. The method of claim 1 wherein the silica abrasive particles exhibit a zeta potential in a range from 10 to 50 millivolts in the slurry.

3. The method of any of claim 1 wherein the slurry contains abrasive particles that include at least 95 weight percent silica particles based on total weight abrasive particles, and the silica particles contain at least 60 weight percent cationic silica particles based on total weight silica particles.

4. The method of claim 1 wherein the slurry contains abrasive particles that include less than 5 percent by weight alumina particles based on total weight abrasive particles.

5. The method of claim 1 wherein the cationic silica abrasive particles have a particle size of a least 50 nanometers.

6. The method of claim 1 wherein the cationic compound is an aminosilane compound.

7. The method of claim 6 wherein the aminosilane compound is aminopropyltrimethoxysilane.

8. The method of claim 1 wherein the slurry pH is below 2.

* * * * *